June 6, 1933.   W. C. SEALEY   1,913,130
ELECTRIC TRANSFORMER
Filed Jan. 21, 1931

Inventor
William C. Sealey
By Alfred H. Dyson
Attorney

Patented June 6, 1933

1,913,130

UNITED STATES PATENT OFFICE

WILLIAM C. SEALEY, OF LANGHORNE, PENNSYLVANIA, ASSIGNOR, BY MESNE ASSIGNMENTS, TO ALLIS-CHALMERS MANUFACTURING COMPANY, OF MILWAUKEE, WISCONSIN, A CORPORATION OF DELAWARE

ELECTRIC TRANSFORMER

Application filed January 21, 1931. Serial No. 510,146.

This invention relates to improvements in electric railway vehicles and particularly to a system for supplying and controlling the traction motors of such vehicles.

The switching apparatus for railway locomotives, in which the traction motors are operated at low voltage and high current strength, to secure the desired power, is difficult to construct, takes a large amount of space, and is exceedingly heavy because the high current value required for the motor is the factor which value controls in the choice of electrical apparatus to be used. The high voltage and low current values which are most favorable as regards the design of the line, controlling and speed regulating swtiches must, therefore, give way to the low voltage and high current value found most favorable in designing the motors. Proper speed regulation of a vehicle requires a plurality of taps on the secondary winding of the supply transformer and the switches required for each of the taps and the main controller must be designed for the high currents encountered. Further, the size of the conductors must be sufficient to carry the high values of current encountered without undesirable heating.

A concrete example will best illustrate the problem indicated above. In the present practice, a line voltage of about 11000 volts is transformed for supply to each traction motor of an electric railway locomotive at approximately 300 volts. To produce the rated 600 H. P. at 300 volts for each motor, a starting current of about 3000 amps. and a running current of about 1920 amperes is required. Each of the switch portions for the taps of the secondary winding, for which the current ranges from 1920 to 3000 amperes, weighs about 400 pounds so that, with 22 taps for the proper speed regulation, the weight of the tap switches alone is approximately 8800 pounds. The terminals of the transformer also become exceedingly large and difficult to arrange due to the space restrictions encountered in railway vehicle construction.

The size and weight of the controller may be reduced and the size of the cables may be reduced if the primary winding of the transformer is tapped to permit regulation of the supply. A saving in weight of at least 10% and in labor of at least 20% may be obtained with such transformers over the employment of the usual transformers having tapped secondary windings.

Means have been proposed for tapping the primary side of the supply transformers which presents the disadvantage that when only part of the winding is utilized the free end of the winding is brought to a potential greatly in excess of the supply line potential thereby requiring that the transformer be insulated for a very high voltage which can only be done at great expense and entails the addition of considerable weight to the transformer. The primary winding of the transformer can however be tapped in such a manner that no point of the winding will be at a potential in excess of any predetermined value not lower than the supply line potential.

It is, therefore, among the objects of the present invention to provide a supply circuit for the traction motors of electric vehicles in which a supply transformer is tapped on the primary side thereof.

Another object of the invention is to provide a supply circuit in electric vehicles in which the secondary winding of a transformer therein may be connected with the motors without the use of special switches.

Another object of the invention is to provide a supply circuit for electric railway vehicles in which the size and the weight of the switching apparatus and the size of the cables is materially reduced.

Another object of the invention is to provide a supply circuit for electric railway vehicles in which the potential at any point of the transformer primary winding will be limited to a predetermined value below the supply line potential.

Objects and advantages, other than those above set forth, will be apparent from the following description when read in connection with the drawing in which, Figure 1 diagrammatically illustrates one embodiment of the invention.

Figure 1:
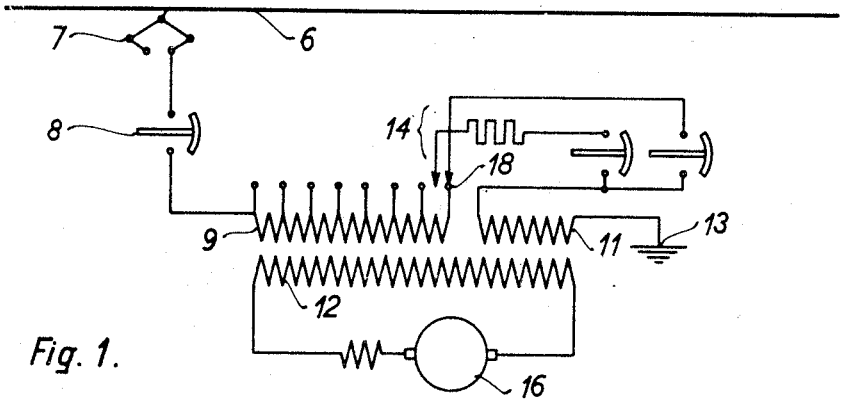

Referring to the drawing by characters of reference, reference numeral 6 refers to a supply line from which current is drawn by means of a current collecting device 7 to a circuit breaker 8 and to the primary windings 9, 11 of a supply transformer grounded as at 13. The secondary winding 12 of the transformer is connected to a traction motor 16 without the interposition of any tap-changing equipment. Primary windings 9, 11 of the transformer are connected by means of any of the devices known in the art for changing taps under load which means are shown in the drawing by a diagrammatical representation of a conventional step switch with a protective resistance.

The connections shown in Figure 1 are those which would obtain when the vehicle is ready for starting, starting being produced by closure of circuit breaker 8. Both windings 9 and 11 are then wholly connected in series between the supply line and ground so that the magnetic flux in the core of the transformer is at its minimum and the minimum obtainable voltage is impressed on motor 16.

To accelerate the vehicle, winding 9 is gradually cut out of the circuit by means of tap changer 14 until only winding 11 is connected between the supply line and ground. The magnetic flux in the core of the transformer is then at its maximum and the maximum obtainable voltage is impressed on motor 16. It will easily be understood that, if winding 9 has twice the number of turns of winding 11 and the connections are as shown in Figure 1, point 18 of winding 9 will be at one-third the supply line voltage above ground upon closure of circuit breaker 8. When winding 9 is completely cut out of circuit by means of tap changer 14, full line voltage is impressed across winding 11 and the same voltage must therefore also obtain across one-half of winding 9. The middle point of winding 9 will therefore be at ground potential while point 18 of winding 9 will be at a potential equal to the supply line voltage but lagging the voltage by half a cycle. It can therefore be seen that no point of winding 9 or 11 is brought to a higher voltage than the supply line voltage.

Figure 2:
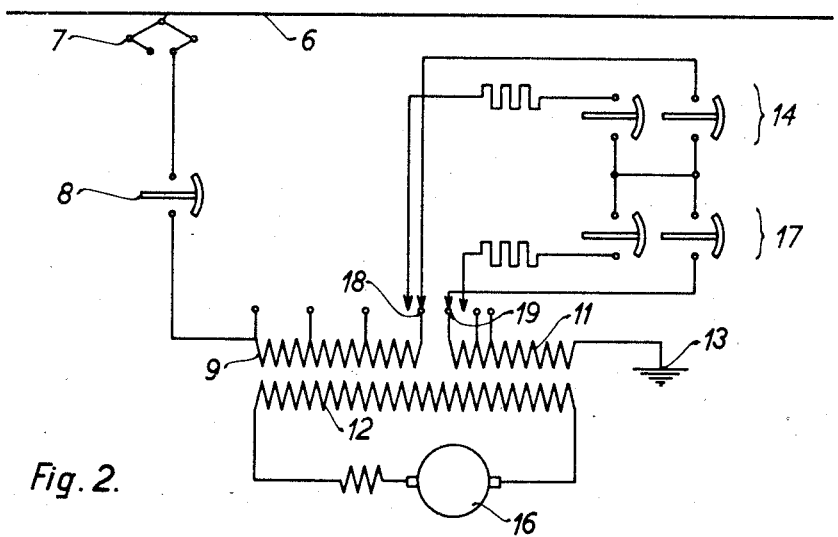
Figure 2 shows a modification of the embodiment shown in Figure 1.

The embodiment shown in Figure 2 differs from the embodiment shown in Figure 1 by the addition of a second tap changer 17 operable for changing the connections to winding 11. Winding 11 is then provided with taps dividing it into steps which are different in value from the steps provided in winding 9. By properly selecting taps on windings 11 and 9, it is possible to raise the voltage in winding 12 in a great number of steps by a much smaller number of taps than are necessary in the embodiment of Figure 1 which requires one tap for every voltage step.

Figure 3:
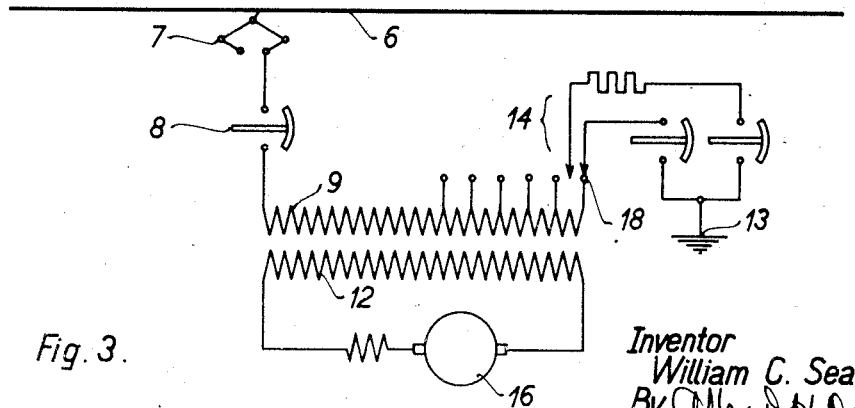
Figure 3 shows a further modification of the embodiment shown in Figure 1.

In the modification shown in Figure 3, winding 11 is omitted altogether so that tap changer 14 is directly connected to ground at 13. The tap changer being at ground potential does not require insulation and can therefore be made very economically. It may however be seen that, if it is desired that the voltage at point 18 shall not exceed the supply line voltage, only one-half of winding 9 need be provided with taps and the minimum voltage obtainable from winding 12 is then one-half of its maximum voltage whereas in the embodiment shown in Figure 1 such voltage could be reduced to one-third of the maximum voltage. In case reduction below one-third of the maximum voltage is desirable, constructions as above disclosed will result in a lower maximum voltage to ground than if the usual construction were employed.

The invention claimed is:

1. In a control system for electric motors, an alternating current supply line, a transformer having a tapped primary winding divided into two tapped portions, a tap changer for serially connecting the primary winding portions, one of the winding portions being so connected with said supply line and the other of the winding portions being so connected with ground that the maximum difference in potential between the ineffective ends of said winding portions and ground equals the difference in potential between said supply line and ground, and a motor connected in series with the secondary winding of said transformer.

2. In a control system for electric motors, an alternating current supply line, a transformer having a primary winding divided into two tapped portions, the taps of one of the primary winding portions being of values different from the values of the other of the primary winding portions, a tap changer for serially connecting the primary winding portions, one of the winding portions being so connected with said supply line and the other of the winding portions being so connected with ground that the potential difference between any portion of said winding and ground does not exceed the potential difference between said supply line and ground, and a motor connected in series with the untapped secondary winding of said transformer.

3. In an electrical control system, a source of alternating potential including a grounded conductor, a tapped transformer winding energized from said source of potential, and means for so connecting said grounded conductor with the taps of said winding that the potential difference between any portion of said tapped winding and said grounded conductor does not exceed the potential difference across said source.

4. In an electrical control system, a source of alternating potential having a grounded conductor, a transformer having a tapped primary winding and an untapped primary winding, and means including a tap changing switch for so connecting said untapped winding in series with various portions of said tapped primary winding that the potential difference between the inactive end portion of said tapped winding and said grounded conductor does not exceed the potential difference across said source.

5. In an electrical control system, a line conductor having an alternating potential impressed between said conductor and ground, a transformer having a tapped primary winding with one end thereof connected to said conductor and having an untapped primary winding with one end thereof connected to ground, and means for connecting the other end of said untapped primary winding in series with various portions of said tapped primary winding.

6. In a voltage regulating system, the combination of, a line conductor having an alternating potential impressed thereon relative to ground, a transformer having an untapped winding with one end thereof connected to ground and having a tapped winding with the end, which has an opposite instantaneous polarity relative to the instantaneous polarity of the grounded end of said untapped windings, connected to said line conductor, and means including a tap changer for connecting the ungrounded end of said untapped winding to various turns of said tapped winding.

7. In a voltage regulating system, the combination of, a line conductor having an alternating potential impressed thereon relative to ground, a transformer having an untapped winding with one end thereof connected to ground and having a tapped winding with the end, which has an opposite instantaneous polarity relative to the instantaneous polarity of the grounded end of said untapped winding, connected to said line conductor and also having a secondary winding, means including a tap changer for connecting the ungrounded end of said untapped winding to various turns of said tapped winding, and a motor connected across said secondary winding.

8. In a voltage regulating system, the combination of, a line conductor and a ground potential element having an alternating potential impressed therebetween, a transformer having two primary windings, at least one of which is provided with taps and having a secondary winding, a translating device connected with said secondary winding, means for connecting one end of each of said primary windings to said conductor and said ground potential element respectively, and means comprising a tap changing switch for serially connecting said various portions of said windings so that the potential difference between any part of said primary winding and said ground potential element does not exceed the potential difference between said line conductor and said ground potential element.

In testimony whereof I have hereunto subscribed my name this 20th day of January, A. D. 1931.

WILLIAM C. SEALEY.